(12) United States Patent
Zuili et al.

(10) Patent No.: US 7,437,875 B2
(45) Date of Patent: Oct. 21, 2008

(54) THERMALLY DRIVEN COOLING SYSTEMS

(76) Inventors: Patrick Zuili, 1007 Palm Island Dr., Boca Raton, FL (US) 33498; Sean Hackner, 1200 NW. 17th Ave., Suite 20, Delray Beach, FL (US) 33445

( * ) Notice: Subject to any disclaimer, the term of this patent is extended or adjusted under 35 U.S.C. 154(b) by 393 days.

(21) Appl. No.: 11/251,474

(22) Filed: Oct. 14, 2005

(65) Prior Publication Data

US 2007/0084207 A1    Apr. 19, 2007

(51) Int. Cl.
*F03G 6/00*    (2006.01)

(52) U.S. Cl. .................... 60/641.11; 60/641.15

(58) Field of Classification Search ............... 60/641.8, 60/641.11, 641.15
See application file for complete search history.

(56) References Cited

U.S. PATENT DOCUMENTS

| | | | |
|---|---|---|---|
| 4,103,493 A * | 8/1978 | Schoenfelder | 60/641.11 |
| 4,280,328 A * | 7/1981 | Falconer | 60/641.12 |
| 6,735,946 B1 * | 5/2004 | Otting et al. | 60/641.11 |
| 6,911,186 B2 * | 6/2005 | Taylor et al. | 422/186.07 |
| 6,957,536 B2 * | 10/2005 | Litwin et al. | 60/641.8 |
| 7,191,597 B2 * | 3/2007 | Goldman | 60/641.8 |
| 2003/0066476 A1 * | 4/2003 | Caillat et al. | 117/3 |

* cited by examiner

*Primary Examiner*—Hoang M Nguyen
(74) *Attorney, Agent, or Firm*—Joe Zheng

(57) ABSTRACT

Designs of cooling systems that operate entirely on solar energy are disclosed. Such cooling systems may be used in refrigeration and air conditioning. According to one aspect of the designs, a solar energy collecting device is disposed outdoor to collect solar energy. A first heat-to-electricity pump operating on heated liquid is provided to produce electricity. A storage tank is used to store heated water. A second heat-to-electricity pump is disposed in the storage and operates on the heated water to generate electricity. A cooling system operates on at least three types of working fluids to achieve low temperature evaporation and high temperature condensation to derive cooling effects. A working unit powered by at least one of the first generator and the second generator is provided to utilize the cooling effects from the cooling system.

20 Claims, 5 Drawing Sheets

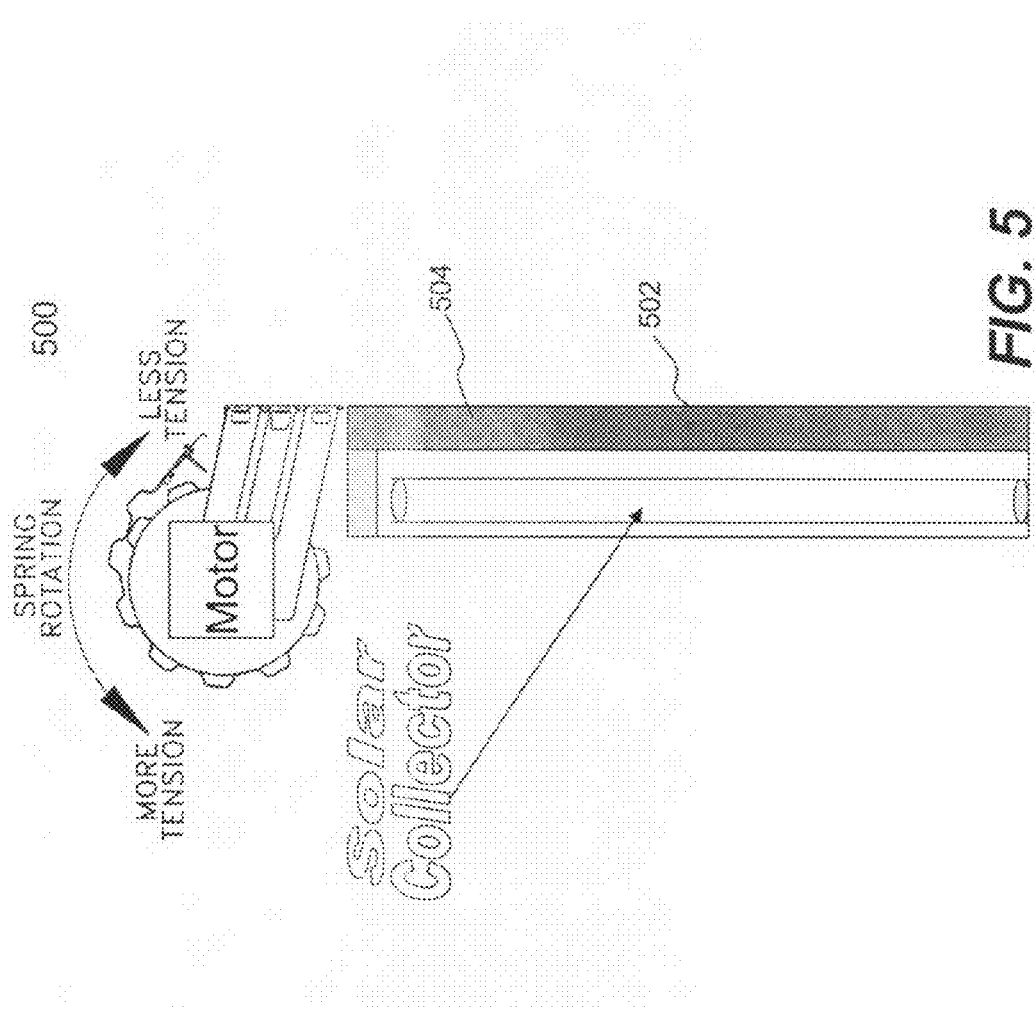

THERMALLY DRIVEN COOLING SYSTEMS

BACKGROUND OF THE INVENTION

1. Field of the Invention

The invention is generally related to the area of solar energy systems. In particular, the present invention is related to thermally driven cooling systems based on solar energy, wherein the thermally driven cooling systems can be readily used in solar air conditioning and refrigeration.

2. The Background of Related Art

Faced with the reality of scarce oil resources, there is a resurgence of interest in solar energy. Compared to the old forms of depletable energy (coal, oil, nuclear), solar energy offers a clean renewable form of energy. Various solar systems have been designed to capture the solar energy and put the energy in different applications. One exemplary solar system is to heat water by solar energy.

FIG. 1 shows a prior art solar system 100 that includes a solar batch heater 102, a solar collector 104, a first pump 106, a second pump 108 and a water storage tank 110. The solar batch heater 102, commercially available or to be readily made, absorbs solar energy and heats up a water flow going through. The first pump 106 is provided to drive a type of liquid (e.g., antifreeze) through the solar batch heater 102 and subsequently heat water stored in the water storage tank 110. While cold water may be replenished into the water storage tank 110 as the heated water is pumped out for use by the second pump 108, the first pump 106 circulates the liquid through the solar batch heater 102 to be heated. The solar collector 102 is provided to generate heat from the solar energy, and can be optionally coupled to a photovolvaic energy collector to provide electricity. Both of the first pump 106 and the second pump 108 may be driven by the power from the photovolvaic energy collector or energized by regular household electricity.

FIG. 1 shows a water heating system without using any external electricity and has been proven fairly efficient. In daily life, there are many other appliances that may be powered by solar energy, for example, air conditioning and refrigerators, both are traditionally powered by electricity. The present invention is to provide a cooling system without using any external electricity that may be readily used to power air conditioning and refrigeration entirely using solar energy.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to designs of cooling systems that may be used in refrigeration and air conditioning. According to one aspect of the present invention, a solar energy collecting device is disposed outdoor to collect solar energy. A first heat-to-electricity generator by the accelerated magnetic piston generator operating on heated liquid (e.g., antifreeze water/refrigerant) is provided to produce electricity. A storage tank is used to store heated water. The first pump device, powered by the accelerated magnetic piston generator, provides the electricity to the pump to circulate the liquid through the storage so that the liquid is gradually heated up when going through the solar energy collecting device. A second heat-to-electricity generator is disposed in the storage water and operates on the heated water to generate electricity. A cooling system operates on at least three types of working fluids to achieve low temperature evaporation and high temperature condensation to derive cooling effects. A working unit powered by at least one of the first generator and the second generator is provided to utilize the cooling effects from the cooling system. As a result, an air conditioner or a refrigerator can be readily implemented, where the air conditioner or refrigerator operates entirely on solar energy.

According to another aspect of the present invention, a retractable shield is provided to protect a solar energy collecting device. In general, a solar energy collecting device, some including silicon cells, is very fragile. It is desired to provide some means of protection to the solar energy collecting device. In one embodiment, a retractable shield is controlled by an automatic roller operating in accordance with one or more sensors. When, for example, the wind is too strong or the heat is too intense, the roller operates to have a shield cover partially or entirely the solar energy collecting device.

The present invention may be implemented in many ways as a subsystem, a device or a method. According to one embodiment, the present invention is a cooling apparatus that comprises a collecting device disposed outdoor to collect solar energy, a circulating device causing a type of liquid to go through the collecting device in circulation so that the liquid is gradually heated by the collecting device; a storage provided to store water to be heated by the heated liquid; a first generator converting heat/pressure in the liquid to electricity; a cooling system operating on at least three types of working fluids that achieve low temperature evaporation and high temperature condensation to derive cooling effects; and a working unit powered by at least the first generator to utilize the cooling effects from the cooling system.

One of the objects, features, advantages of the present invention is to provide a cooling mechanism that operates entirely on solar energy.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 5 shows a side view of an embodiment using a shield that can be retracted along a pair of tracks to cover a solar batch heater.

DETAILED DESCRIPTION OF THE PREFERRED EMBODIMENT

The present invention pertains to designs of cooling systems that may be used in refrigeration and air conditioning. Such cooling systems operate entirely on solar energy. The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
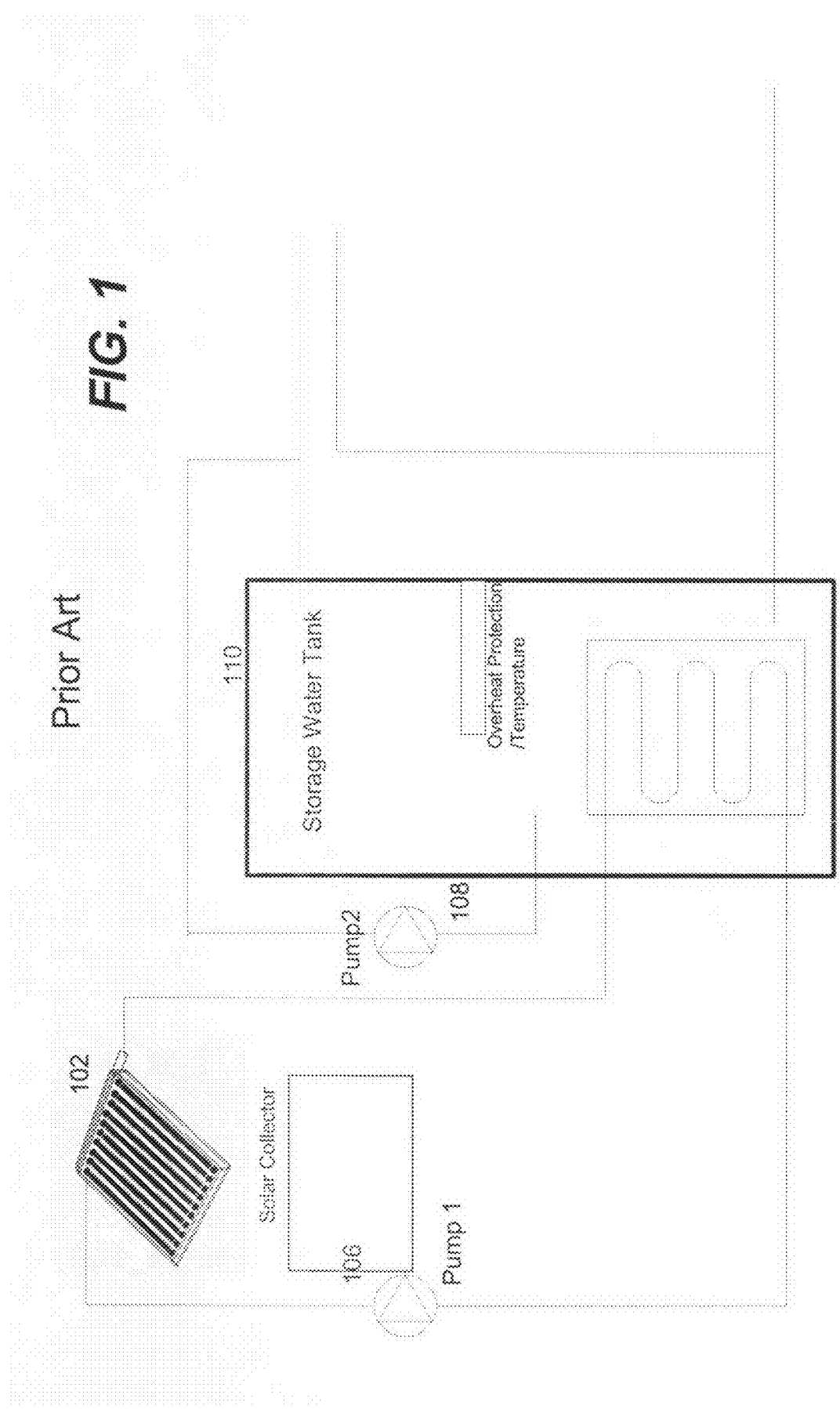
FIG. 1 shows a prior art solar system that includes a solar batch heater, a solar collector, a first pump, a second pump and a water storage tank.
Figure 2:
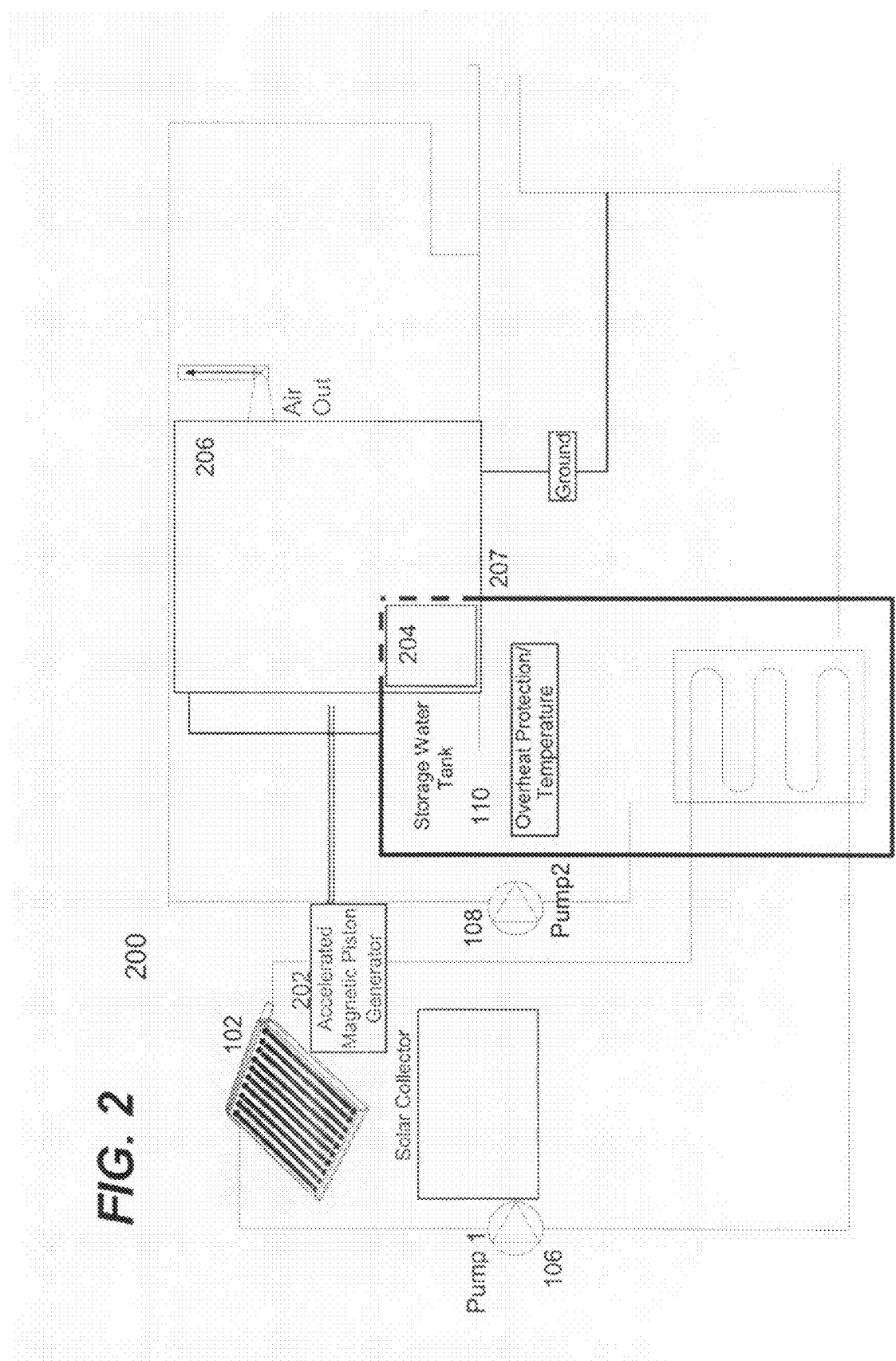
FIG. 2 shows an exemplary design in accordance with one embodiment of the present invention.

Referring now to the drawings, in which like numerals refer to like parts throughout the several views. FIG. 2 shows an exemplary design 200 in accordance with one embodiment of the present invention. In addition to the solar batch heater 102, the first pump 106, the second pump 108 and the water storage tank 110 as described in FIG. 1, the design 200 includes a first power generator 202, and a second power generator 204 and a cooling system 206. The first power generator 202 is connected to the solar batch heater 102. With the heated water from the solar batch heater 102, the first power generator 202 produces electricity. According to one embodiment, the first power generator 202 is an accelerated magnetic piston generator that is known to have the flexibility to be powered by any source of thermal (heat) or pressure energy to produce electricity. The website address "http://peswiki.com/index.php/Directory:Accelerated Magnetic Piston Generator", which is incorporated by reference, shows the principle of an exemplary accelerated magnetic piston generator.

Figure 3:
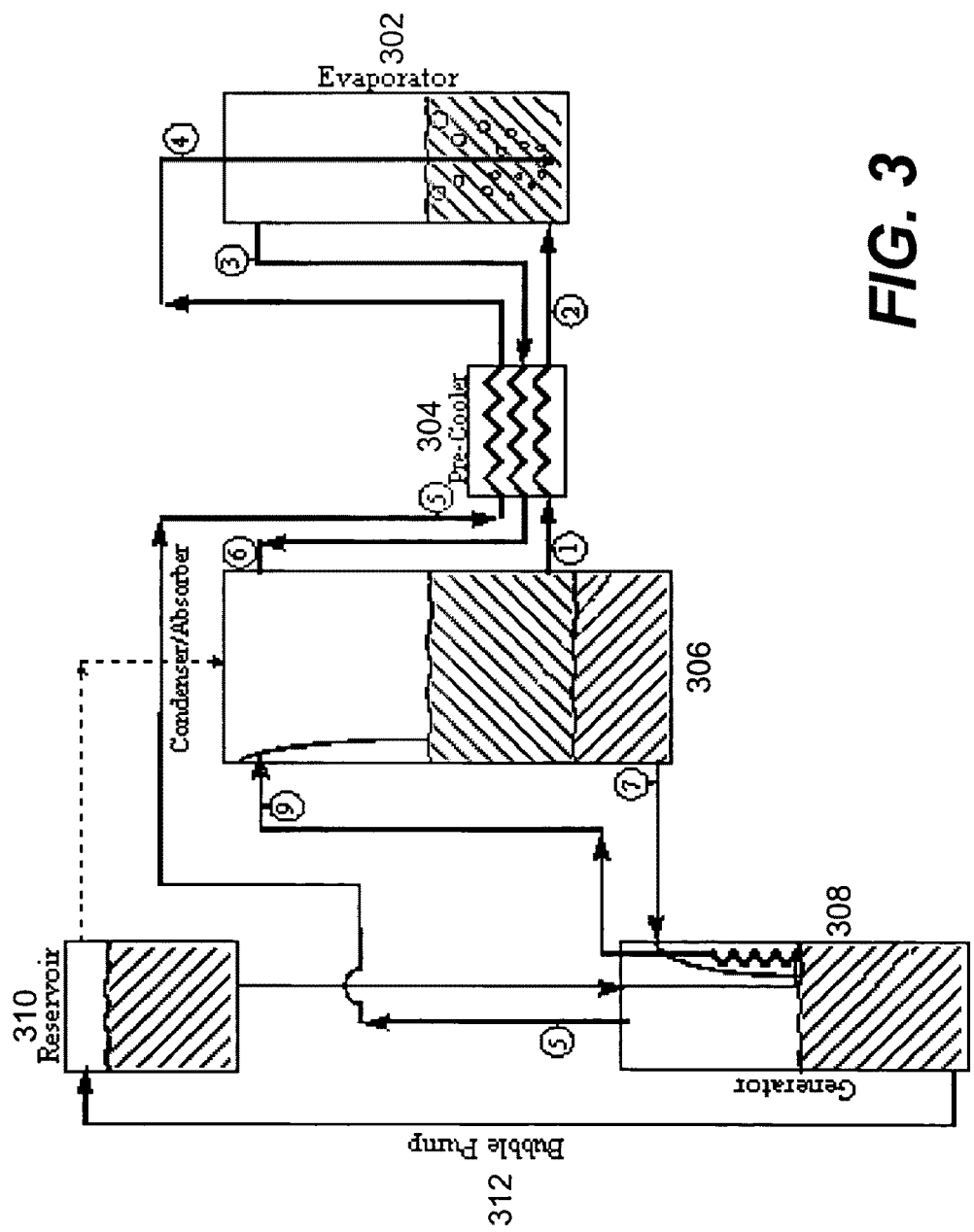
FIG. 3 shows a functional block diagram of an exemplary cycle thermodynamic model.

When solar energy is not available (in the evening), to keep an apparatus (e.g., air conditioning) running supoorted by the design 200, a second power generator 204, located in the water storage tank 110, and at 207 is provided. The cooling system 206 is provided to generate cooling effects based on what is referred to as a cycle thermodynamic model. FIG. 3 shows a functional block diagram of an exemplary cycle thermodynamic model 300.

The cycle thermodynamic model 300 includes an evaporator 302, pre-cooler 304, a condenser/absorber 306, a generator 308, a reservoir 310, and a bubble pump 312. According to one embodiment, the evaporator 302 stores partially a type of refrigerant and pressure equalizing gas, both arriving from the pre-cooler 304 in nearly pure form (shown as points 4 and 2). As described what is commonly referred to as the Einstein-Szilard pump, the refrigerant evaporates in the presence of the pressure equalizing gas due to a lowering of the partial pressure of the refrigerant. The pressure equalizing gas is close to condensation in the evaporator 302, the actual process is further described below.

First, nearly pure saturated liquid butane flows in from the condenser/absorber 306 at the condenser/absorber temperature (noted as state 2 in FIG. 3). Simultaneously, saturated vapor ammonia (noted as state 4 in FIG. 3) is bubbled into the liquid butane. The presence of the ammonia vapor reduces the partial pressure of the butane causing it to evaporate. As it evaporates into the ammonia vapor, the butane cools itself, the ammonia vapor, and produces external cooling. A small amount of ammonia vapor is also absorbed into the liquid butane producing some heat of absorption which is also removed by the evaporating butane. For a given system pressure, the temperature in the evaporator 302 depends upon the relative butane-ammonia flow rates. To prevent a temperature glide, which increases the evaporator temperature, the design condition is taken to be at the azeotrope.

Although the vapor mixture leaving the evaporator 302 at state 3 is not cold enough to provide additional refrigeration, it is cold relative to the fluids coming to the evaporator 302. The pre-cooler 304 allows the cooling of the two streams entering the evaporator 302 via the heating of the stream leaving the evaporator 302. The pre-cooler 304 is assumed to operate under steady state conditions with no fluid friction and is insulated so that the only heat transfer occurs between the entering streams and exiting streams. Thus the conservation of mass will be satisfied between the evaporator 302 and condenser/absorber 306.

In the refrigeration cycle, the condenser and absorber are combined into a single component 306 where both processes occur simultaneously as shown in FIG. 3. When the vapor mixture leaving the pre-cooler 304 at state point 6 enters the condenser/absorber 306, it encounters a large surface area created by a falling film of sub-cooled liquid water weak in ammonia. The water film, which enters the condenser/absorber 306 at state 9, readily absorbs the ammonia from the vapor mixture. This increases the concentration of butane in the vapor and hence the partial pressure on the butane in the vapor. Now the butane can condense at its saturation temperature for this system pressure which is well above the temperature at which it evaporated earlier in the evaporator 302.

The liquid water, now rich in ammonia, and butane descend the walls of the condenser/absorber 306. Since the ammonia-water solution is immiscible with the butane, and is more dense, it sinks to the bottom of the condenser and flows out at point 7. The light, immiscible butane floats atop the solution and exits at point 1. The condenser operates at steady state and the liquids leaving the condenser are assumed to be in thermal and vapor-liquid equilibrium at the temperature of the condenser.

In the generator 308, ammonia rich water arriving from the condenser/absorber 306 is heated. This generates vapor ammonia (shown as state 5 in FIG. 3) which then flows to the evaporator 302. The remaining water, containing less ammonia, drops to the bottom of the generator where it flows into the bubble pump and is returned to the condenser. Before it is returned to the condenser, this hot ammonia-water solution transfers its heat to the cooler ammonia-water solution arriving from the condenser/absorber 306.

To circulate the working fluids without a mechanical pump, the cycle relies on a bubble pump 312. A bubble pump is a heated tube (length L and diameter d) communicating with two reservoirs, one higher than the other. The liquid in the lower reservoir 308 initially fills the tube to the same level (h). Heat is applied at the bottom of the tube at a rate sufficient to evaporate some of the liquid in the tube. The resulting vapor bubbles rise in the tube carrying the liquid above them to the higher reservoir. The bulk density of the fluid in the tube is reduced relative to the liquid in the lower reservoir, thereby creating an overall buoyancy lift.

It is known in the art that there are four flow regimes for two-phase up flow in a fixed diameter vertical pipe. For low vapor flow rates, small, finely dispersed vapor bubbles will rise in a continuous liquid phase. This is the bubble flow regime. Increasing the vapor flow causes the vapor bubbles to coalesce into bullet shaped slugs of vapor which rise in the liquid phase. This is the slug flow regime, and a bubble pump operates most efficiently here. Further increase of vapor flow causes a highly oscillatory flow with a tendency for each phase alternatively to fill the tube. This is the churn flow regime. The last flow regime, reached by even further increase of vapor flow, is the annular flow regime in which the liquid forms a film around the pipe wall and the vapor rises up the core. For further information about the operation of the cycle thermodynamic model 300, the website address "http://www.me.gatech.edu/energy/andy phd/three.htm", which is hereby incorporated by reference, has a detailed description together with all necessary theory to support the operation.

Figure 4:
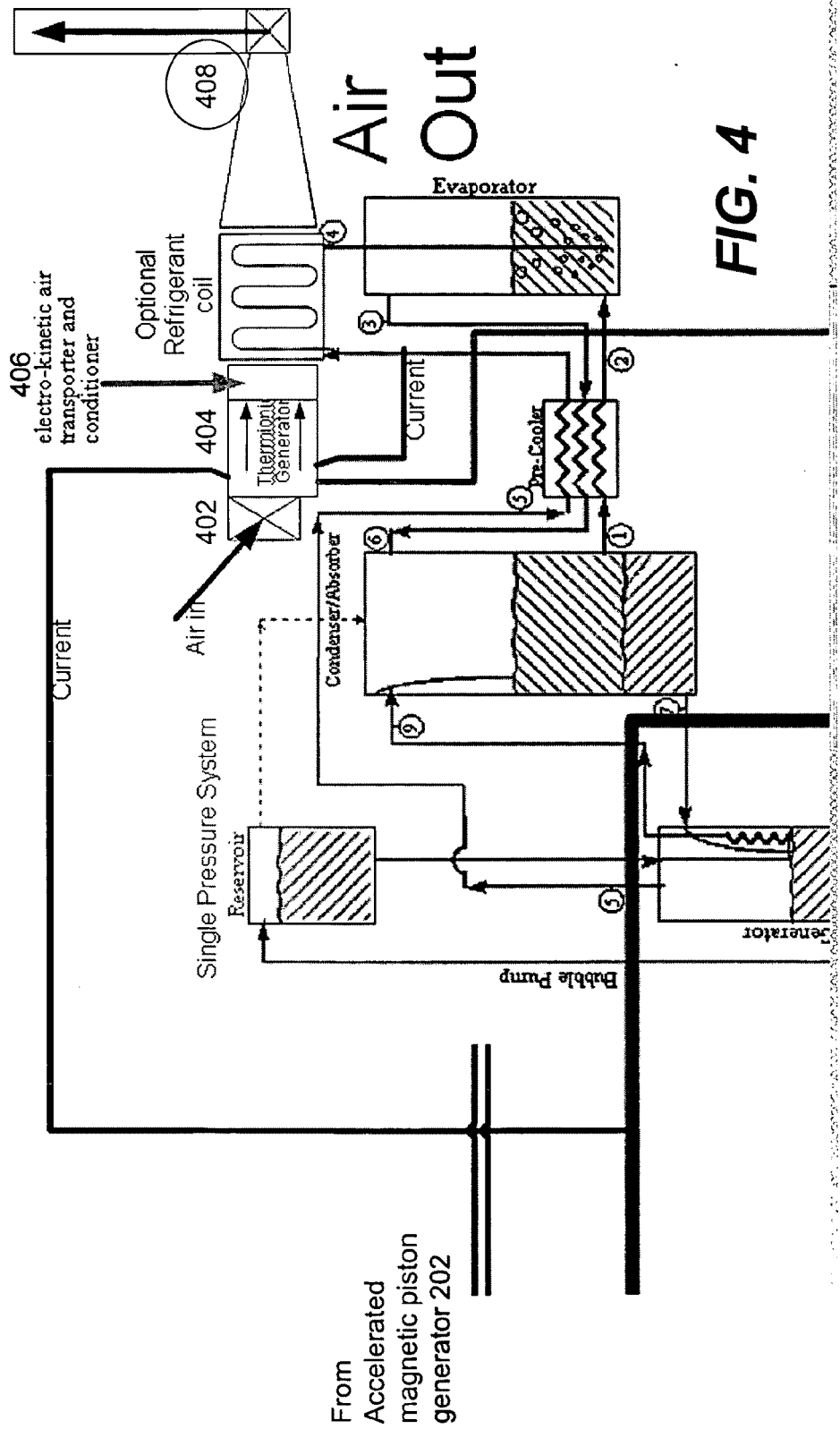
FIG. 4 shows one embodiment of generating cool air based on the cycle thermodynamic model of FIG. 3.

Referring now to FIG. 4, there shows one embodiment of generating cool air based on the cycle thermodynamic model 300 of FIG. 3. Air (assuming hot air) comes at an opening 402. A thermionic generator 404 is essentially a heat-to-electrical generator provided to energize an air transporter 406. In one embodiment, the air transporter 406 is an electro-kinetic air transporter and conditioner. An exemplary electro-kinetic air transporter and conditioner is detailed in U.S. Pat. No. 6,911, 186 which is hereby incorporated by reference. The air transporter 406 creates an air flow that pass through an optional refrigerant coil being cooled by the cycle thermodynamic design 300 of FIG. 3. The cooled air exits from an air ventilation opening 408. As a result, an air conditioning system is created and operates entirely on solar energy.

According to one embodiment of the present invention, an array of vacuum solar tubes are used to collect the heat (solar energy), the heated water/refrigerant is stored into the hot water in one or more water tanks. The heat source in the water tanks is supplied to a single pressure direct thermally driven cycles system that requires no electricity because a complete cycle operates under single pressure. Using the gravity as a pump, this single pressure eliminates the need for a mechanical/electrical pump.

These cycles need to use at least three types of working fluids that achieve low temperature evaporation and high temperature condensation by utilizing the partial pressure of the refrigerant for the benefits of complete silent operation and cost effective solution, In addition, the cooling devices (e.g., a refrigerator or an air conditioner) contemplated in accordance with the present invention include no moving parts and provide high reliability and portability in overall performances.

According to one embodiment, a combination of water and antifreeze is used for solar energy collection (e.g., solar batch heater and solar heat recovery and storage) while a combination of iso-butane, ammonia and water are used for the single pressure system (e.g., the cycle thermodynamic model) that deliver the cooling effects. A thermionic generator (e.g., triode designs) is used to convert heat into ions that can be used to create an air flow from an air inlet to an air outlet, for the ventilation system or by the usage of an accelerated magnetic piston generator inside a water heated tank or/and inside the single pressure mechanism to generate electricity (from heat, or pressure) that permit to use the ionic generator for creating the airflow.

The energy necessary to run a negative air ionizer (e.g., an electro-kinetic air transporter and conditioner) come from an accelerated magnetic piston generator inside the hot water tank and/or inside the single pressure mechanism or both of them at the same time. In one embodiment, the energy comes form a generator in the hot water tank, where the generator includes two dissimilar metal wires and the temperature difference between the junction of the two dissimilar metal wires produces a voltage potential (known as the Seebeck effect), US Patent Publication 20030066476, which is hereby incorporated by reference, has a detailed description of such operation. The electricity can now energize the air ionizer, and in addition to the single pressure system that generates cold to generate air conditioning.

To protect the vacuum solar tubes, FIG. 5 shows a side view of an embodiment 500 using a shield 502 that can be retracted along a pair of tracks 504. The operation of the shield 502 is controlled by a motor that is in return controlled by one or more sensors. Examples of the sensors may include temperature sensor or wind velocity sensor. In general, the vacuum solar tubes or a solar energy collecting device is disposed outdoor. When the liquid going through the vacuum solar tubes is heated beyond a predefined temperature (e.g., via a temperature sensor), the shield may be in partially or fully closed position so as to reduce or stop the solar energy absorption. Likewise, when wind speed exceeds a predefined velocity (via a wind velocity sensor), the shield may be in fully closed position to protect the vacuum solar tubes from being damaged by the wind. According to one embodiment, the motor, an auxiliary circuit, possible the sensors are powered by one of the first power generator 202 and the second power generator 204 or batteries.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. A cooling apparatus comprising:
    a collecting device disposed outdoor to collect solar energy;
    a circulating device causing a type of liquid to go through the collecting device in circulation so that the liquid is gradually heated by the collecting device;
    a storage provided to store the heated liquid from the collecting device;
    a first generator converting heat in the heated liquid to electricity;
    a cooling system operating on at least three types of working fluids that achieve low temperature evaporation and high temperature condensation to derive cooling effects; and
    a working unit powered by at least the first generator to utilize the cooling effects from the cooling system.

2. The cooling apparatus as recited in claim 1, wherein the collecting device includes an array of vacuum tubes to allow the liquid to pass through.

3. The cooling apparatus as recited in claim 2, wherein the liquid is a type of water/antifreeze.

4. The cooling apparatus as recited in claim 1, wherein the first generator is a heat-to-electricity generator.

5. The cooling apparatus as recited in claim 4, wherein the heat-to-electricity generator is an accelerated magnetic piston generator.

6. The cooling apparatus as recited in claim 4, wherein the circulating device includes a first pump powered by electricity from the heat-to-electricity generator.

7. The cooling apparatus as recited in claim 1, further comprising a second generator disposed in the storage, the second generator producing electricity from heat in the heated liquid in the storage.

8. The cooling apparatus as recited in claim 7, wherein the second generator is to supply electricity when the solar energy is not sufficiently available.

9. The cooling apparatus as recited in claim 7, wherein the working unit is also powered by the second generator.

10. The cooling apparatus as recited in claim 1, wherein the cooling system operates in accordance with the Einstein-Szilard pump to produce the cooling effects without using any electricity.

11. The cooling apparatus as recited in claim 1, wherein the cooling system operates in accordance with the cycle thermodynamic model to produce the cooling effects without using any electricity.

12. The cooling apparatus as recited in claim 11, wherein the cooling apparatus is readily used in solar air conditioning and refrigeration.

13. The cooling apparatus as recited in claim 1, wherein the working unit is powered by either of the first generator and the second generator, and further includes an electro-kinetic air transporter to generate an air flow from an air inlet to an air outlet.

14. The cooling apparatus as recited in claim 13, wherein the working unit receives air from the air inlet and exits the air from the air outlet, where the air is cooled down by the cooing effects from the cooling system.

15. The cooling apparatus as recited in claim 14, wherein the cooling apparatus is an air conditioner.

16. The cooling apparatus as recited in claim 14, wherein the electro-kinetic air transporter also includes a negative air ionizer so that the air is ionized.

17. A cooling apparatus comprising:
a solar energy collecting device disposed outdoor to collect solar energy;
a first heat-to-electricity pump operating on a type of liquid heated in the solar enemy collecting device to produce electricity;
a storage to store the heated liquid;
a first pump device powered by the electricity from the heat-to-electricity pump to circulate the liquid through the storage so that the liquid is gradually heated when going through the solar energy collecting device;
a second heat-to-electricity pump disposed in the storage and operating on the heated liquid to generate electricity;
a cooling system operating on at least three types of working fluids that achieve low temperature evaporation and high temperature condensation to derive cooling effects; and
a working unit powered by at least one of the first generator and the second generator to utilize the cooling effects from the cooling system.

18. The cooling apparatus as recited in claim 17, wherein the working unit is part of a refrigerator.

19. The cooling apparatus as recited in claim 17, wherein the working unit includes an electro-kinetic air transporter to generate an air flow from an air inlet to an air outlet.

20. The cooling apparatus as recited in claim 19, wherein the cooling apparatus is part of an air conditioner.

* * * * *